Sept. 21, 1954  H. J. VEGTER  2,689,810
SEPARATION OF STARCH AND GLUTEN
Filed July 22, 1953  7 Sheets-Sheet 1

Sept. 21, 1954     H. J. VEGTER     2,689,810
SEPARATION OF STARCH AND GLUTEN
Filed July 22, 1953     7 Sheets-Sheet 2

Sept. 21, 1954  H. J. VEGTER  2,689,810
SEPARATION OF STARCH AND GLUTEN
Filed July 22, 1953  7 Sheets-Sheet 5

Patented Sept. 21, 1954

2,689,810

UNITED STATES PATENT OFFICE 2,689,810

SEPARATION OF STARCH AND GLUTEN

Herman J. Vegter, Koog aan de Zaan, Netherlands, assignor to Stamicarbon N. V., Heerlen, Netherlands Application July 22, 1953, Serial No. 369,618

7 Claims. (Cl. 127—69)

This invention relates to the production of starch from cereals, such as corn. More particularly the invention has reference to a process for the separation of starch and gluten solids, each from the other.

In the corn-starch industry starch has to be recovered from a suspended mixture chiefly containing starch particles, gluten particles and water, whereafter the remainder may serve to produce cattle-food. As the average settling rate of the starch particles is faster than the average settling rate of the gluten particles, their separation usually is performed on starch tables and in centrifuges. The reasons why the results of such a separation have to be insufficient will be elucidated in the detailed description of the drawings, but it can be stated here that the finished starch always is contaminated by an appreciable amount of coarse gluten particles, whereas the cattle-food still contains a considerable amount of fine starch particles.

Since the word "gluten" may sometimes be given different meanings, it is important to an understanding of this invention, to make this clear. Gluten generally is used to refer to particles consisting of protein or that are protein-rich as compared to starch particles that have little, if any, protein. Gluten is also sometimes used to refer to the protein-rich fraction after it has been separated from mill starch, that is often processed into cattle-food. So, in this specification, the word "gluten" is used in its broadest sense to include both of these meanings. But, where necessary, the difference will be kept clear by referring to gluten particles as compared with starch particles, and to a gluten fraction as compared with a starch fraction.

It is the object of this invention to improve the quality of the finished starch and to increase the starch recovery.

As has been mentioned already, the average settling rate of the starch particles is faster than the average settling rate of the gluten particles, but the settling rate of large protein particles is faster than the settling rate of small starch particles. Furthermore mixed particles containing starch as well as protein are present in the mixture to be separated.

The presence of large gluten particles therefore hinders the separation and it is in particular the object of this invention to shear the gluten particles from the mixed particles as well as to diminute selectively the large gluten particles and to provide a method therefore, without lessening the size of the starch particles.

I have found that the removal of gluten particles from the mixed particles as well as the selective diminution of the gluten particles can be effected by subjecting the suspended mixture to shearing forces, such as can be established in a confined circular vortex space having an infeed entrance in tangential relation therewith and having a central discharge opening therein. Such an apparatus hereinafter will be called a "diminutor."

When a liquid suspension is fed continuously under pressure into a diminutor, concentric spiralizing films of such suspension are established and maintained in said diminutor, each inner film travelling at a greater rotational velocity than its adjacent outer film, whereby shearing action is exerted at the interfaces between adjacent films.

It has been found that these shearing stresses are substantially proportional to the square root of the feed pressure and are influenced by the dimensions of the diminutor.

A so-called "hydrocyclone" when used in multiple and provided it has the proper dimensions and operating conditions which will be discussed hereinafter, is especially suited for the selective diminution of gluten in mixtures of starch and gluten.

A hydrocyclone is a circular vessel comprising a generally conical part or section which at its widest end preferably merges into a cylindrical part or section. There is an opening at the apex of the cone of the conical section and there is another opening, coaxial with the apex opening, in the cover-plate on the widest section. In the opening in the cover-plate preferably is carried a tube that extends from that plate inwardly into the cylindrical section of the hydrocyclone. This is called a vortex finder. There is a tangential feed inlet to the widest section.

In addition to the shearing action mentioned above, a hydrocyclone effects classification according to settling rate, particles with a slow settling rate being discharged through the vortex finder, particles with a fast settling rate being discharged through the apex opening.

By treating a suspended mixture of starch and gluten particles in a hydrocyclone station, first the shearing action can be made to diminute the gluten particles selectively, whereafter the classifying action can be made to concentrate the starch in the apex discharge whereas a concentrated gluten fraction is discharged through the vortex finder.

Summarizing, I have found that to improve the quality of corn starch and to increase its recovery from a starch and gluten suspension, the gluten particles should be diminuted selectively before the mixture is subjected to a conventional separation process. This selective diminution of the gluten particles can be effected by subjecting the mixture to shearing forces such as may be established in a diminutor of proper dimensions operating under appropriate working conditions.

The best embodiment of the invention now known to me will be described hereinafter for illustrative purposes but it is to be understood that it is illustrative only and not limiting because obviously certain changes and modifications are possible as long as they fall within the metes and bounds as defined by the appended claims or the functional as well as conjoint co-operative equivalents of the latter's requirements.

In the accompanying drawings the embodiment has been illustrated, wherein

Figure 1:
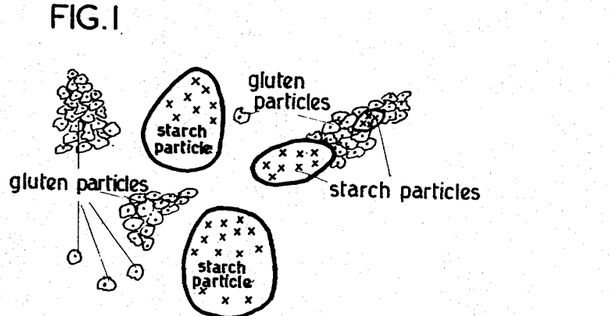
Figure 1 is a schematical enlargement of a cornstarch and gluten mixture.

Figure 1 is a picture to demonstrate the scope of the problem. The starch particles are covered by a protective cellulosic coating or armor, whereas gluten aggregates into a collection of component units which act like a single particle, which is one reason why it is difficult to separate gluten particles from starch.

Another reason is that the gluten particles are more or less like glue and thus tend to cohere or bind not only the gluten agglomerates together but also bind gluten agglomerates and starch particles together.

Figure 2:
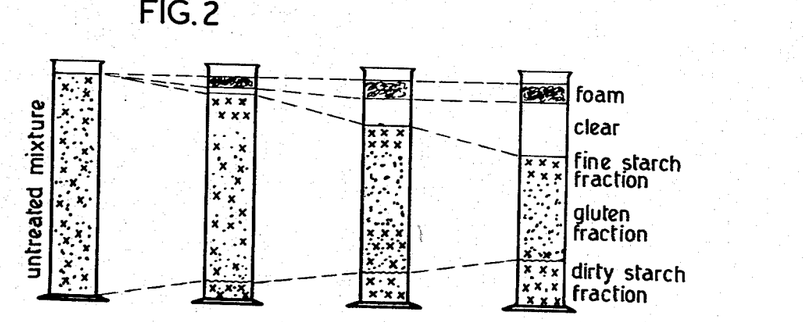
Figure 2 is a diagram of a settling experiment with an untreated cornstarch and gluten mixture.

Figure 2 illustrates what happens when a starch and gluten mixture is brought into a 1 liter measuring cylinder. First some starch settles at the bottom, whereas some foam appears at the top of the suspension. In the starch fraction yellow gluten streaks are clearly visible. While the starch fraction grows, the suspension settles and breaks away from the foam. In the yellow liquid between the foam and the suspension a second starch fraction becomes visible. This second starch fraction contains small starch particles, which cannot pass the gluten fraction. After about half an hour a dirty starch fraction is at the bottom of the cylinder, thereupon follows the gluten fraction, covered by the second starch fraction. The liquid over the second starch fraction is clear but at the top of the liquid where the foam is present.

The contacts between the gluten fraction and the two starch fractions are not sharp.

Although the industrial separation by means of starch tables and centrifuges differs in several respects from the separation effected in a measuring cylinder, it can be stated that the starch which occurs in the second starch fraction in the measuring cylinder, would in an industrial plant be lost in the cattle-food, whereas the vague contact between the gluten fraction and the dirty starch fraction indicates that an industrial plant never can recover pure starch from such mixture.

When, however, a mixture of starch particles and gluten aggregations is subjected to adequate shearing forces the gluten aggregates will be diminuted, whereas the starch particles are not affected substantially.

The diminution of the gluten particles presented a problem. Some instrument had to be found that would exert a shearing effect in the natural gluten aggregative particle to break it down into its smallest components yet with no diminuting effect on the starch particles. I then found that a diminutor could be used to produce such shearing effect provided it has the proper dimensions.

A natural gluten particle is an aggregation or floc somewhat like a bunch of grapes. So the diminutor seems to deflocculate or disperse the component units (probably molecules) to make a mass of discrete tiny particles instead of a much larger particle formed of a cohering collected mass.

Figure 3:
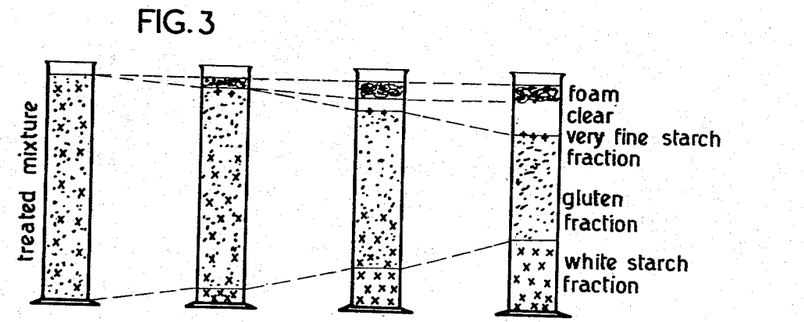
Figure 3 is a diagram of a settling experiment with the same mixture after treatment in a diminutor.

Figure 3 illustrates what happens when a suspended mixture of gluten and starch, identical with the mixture mentioned in the description of Figure 2, is brought into an identical measuring cylinder, but after that mixture has passed through a diminutor whose measurements and operating conditions will be described in the example.

The results of this second experiment resemble the results of the first experiment (Figure 2), but the following differences between the two experiments are clearly visible. In this second experiment more starch settles at the bottom, this starch shows no yellow streaks, there is a much smaller second starch fraction, the contact between the starch and the gluten fraction is sharp, the gluten particles settle more slowly.

In the second experiment the gluten particles have been diminuted so that their settling rates have decreased and mixed particles have been freed of adhering gluten and the resulting clean starch particles settle quicker than the original mixed particles.

The starch particles are not held back and therefore the coarse starch particles can settle quickly without being contaminated by gluten and only the very finest starch particles can appear in the second starch fraction. The second starch fraction can be considered as lost starch. In the second experiment therefore more starch is obtained and this starch is cleaner than the starch of the first experiment.

The diminutor is in reality a conditioner in which the gluten particles are diminuted selectively and in which gluten particles are removed from mixed particles.

This is important in the subsequent separation of the gluten from the starch, because in their natural condition, they partially have the same settling rates, whereas when the particle size of the gluten is lessened its settling rate is slowed down significantly while the settling rate of the starch particles remains the same.

Moreover, the diminuted gluten particles have lost much of their gluelike properties and therefore do not tend to adhere to starch particles.

The two experiments do not show the way in which starch and gluten are separated in industry, but the same properties of the particles, namely their settling rates, are used in the industrial separation and therefore the same difficulties are encountered. The two experiments point out that a gluten and starch mixture can be better separated after diminution of the gluten particles.

Figure 4:
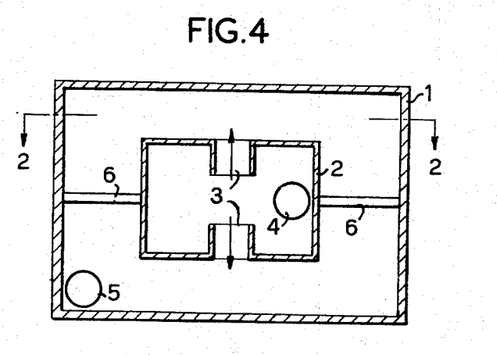
Figure 4 is an enlarged schematical cross section along the axis of a diminutor.
Figure 5:
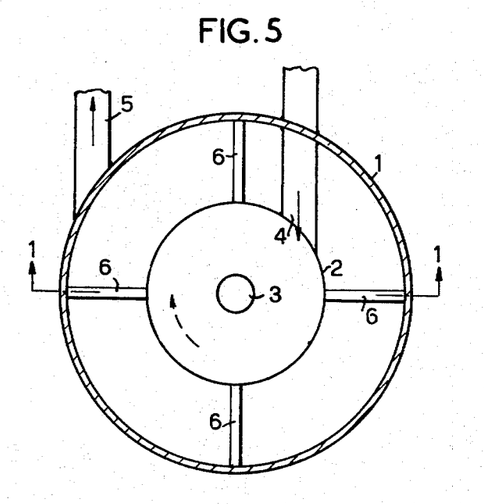
Figure 5 is an enlarged schematical cross section perpendicular to the axis of the diminutor of Figure 4.

The diminutor is shown schematically in Figures 4 and 5 wherein 1 is an outer cylindrical chamber and 2 is an inner cylindrical chamber. The inner chamber 2 has two central discharge apertures 3 and is provided with a feed tube 4 in tangential relation with the inner chamber 2. This tube 4 penetrates the wall of outer chamber 1, the latter being provided with a discharge tube 5 in tangential relation with the outer chamber 1. The inner chamber 2 is supported by four bars 6.

In operation the starch gluten mixture is forced continuously through feed tube 4 into inner chamber 2, wherein spiralizing films of such mixture are established and maintained, each inner film having a greater rotational velocity than its adjacent outer one, so that shearing forces diminute the gluten particles selectively. The mixture is discharged from inner chamber 2 through the discharge apertures 3 into outer chamber 1, and from there through discharge tube 5.

Figure 6:
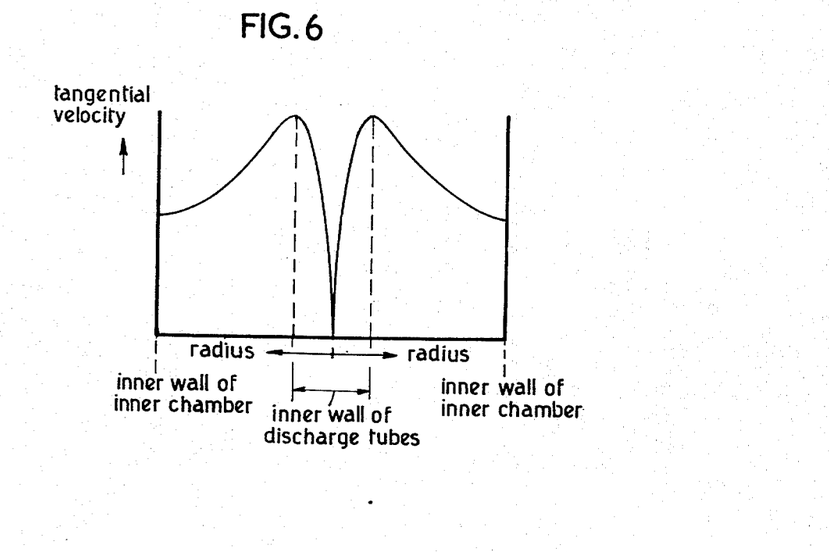
Figure 6 is a schematical graph showing the relation between the tangential velocity of a film in dependence upon its radius.

The diminutor is useful in such diminuting and so far as now known, has no other usefulness. Figure 6 shows the relation between the tangential velocity of a film in dependence upon its radius. This figure is schematical owing to the difficulty in establishing the exact velocities. Several tests however have proved that the tangential velocity is lowest at the periphery and highest substantially on the cylinder defined by the inner walls of the circular discharge apertures.

It will be clear from this figure, that the shearing forces depend upon the feed pressure. When the feed pressure is quadrupled, the mixture enters into the diminutor with double velocity and as a result thereof the velocity at every place in the diminutor is doubled, the difference of the velocities at different places is doubled and therefore also the shearing forces are doubled. It is also obvious that the shearing forces depend upon the dimensions of the diminutor but it is not yet possible to express this dependency in a formula. By increasing the diameter of the central discharge aperture, the inner part where shearing stresses are largest is eliminated, and therefore the shearing forces will decrease resulting in an increase of the particle size. For obtaining a good diminuting effect, the inner walls of a diminutor or hydrocyclone should be smooth, for I have found that with smooth walls a better diminution is effected than with rough walls. Although many materials can be used I prefer hydrocyclones made of rubber or thermoplastic substances like "Bakelite."

It has been found that selective diminution of gluten particles in a mixture of corn-starch, gluten and water takes place in diminutor units of the following dimensions and under the following operating conditions:

| Example | A | B | C |
| --- | --- | --- | --- |
| feed pressure, lb./sq. inch | 60 | 42 | 36 |
| diameter inner chamber 2, mm | 30 | 15 | 10 |
| height inner chamber 2, mm | 20 | 10 | 7 |
| diameter feed entrance 4, mm | 6 | 3 | 2 |
| diameter discharge apertures 3, mm | 6 | 3 | 2 |
| length of discharge apertures 3, in inner chamber, mm | 6 | 3 | 2 |
| diameter of outer chamber 1, mm | 60 | 30 | 20 |
| height of inner chamber 1, mm | 40 | 20 | 13 |
| diameter of discharge tube 4, mm | 8 | 4 | 3 |
| discharge pressure, atmospheric | | | |

Very good results are obtained with the diminutor unit of example B, operated at a feed pressure of 114 lbs. per square inch gauge pressure. When a mixture is treated repeatedly in diminutors in series the effect is even better. For industrial application many diminutor units have to be provided in the diminuting station.

Figure 7:
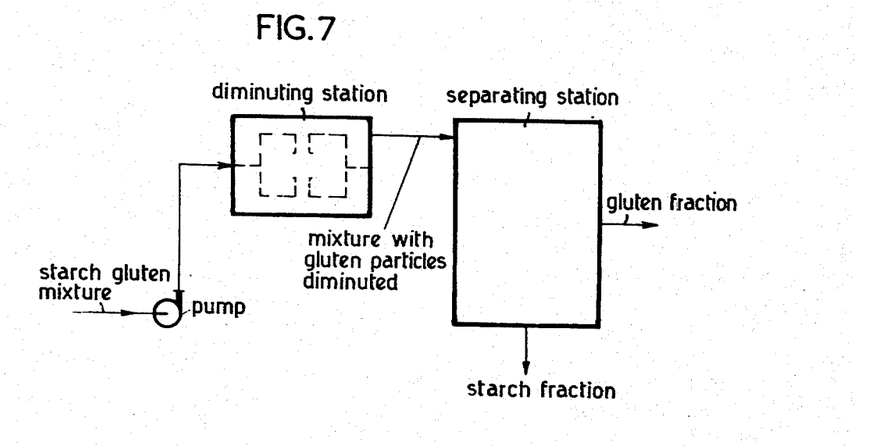
Figure 7 is a flowsheet of one embodiment of the invention.

Figure 7 shows schematically how the invention may be made use of in industry. A starch and gluten mixture is continuously pumped into the diminuting station, whereafter the fractions leaving the diminuting station are forwarded into the separating station where the starch and the gluten are separated, the one from the other.

Figure 8:
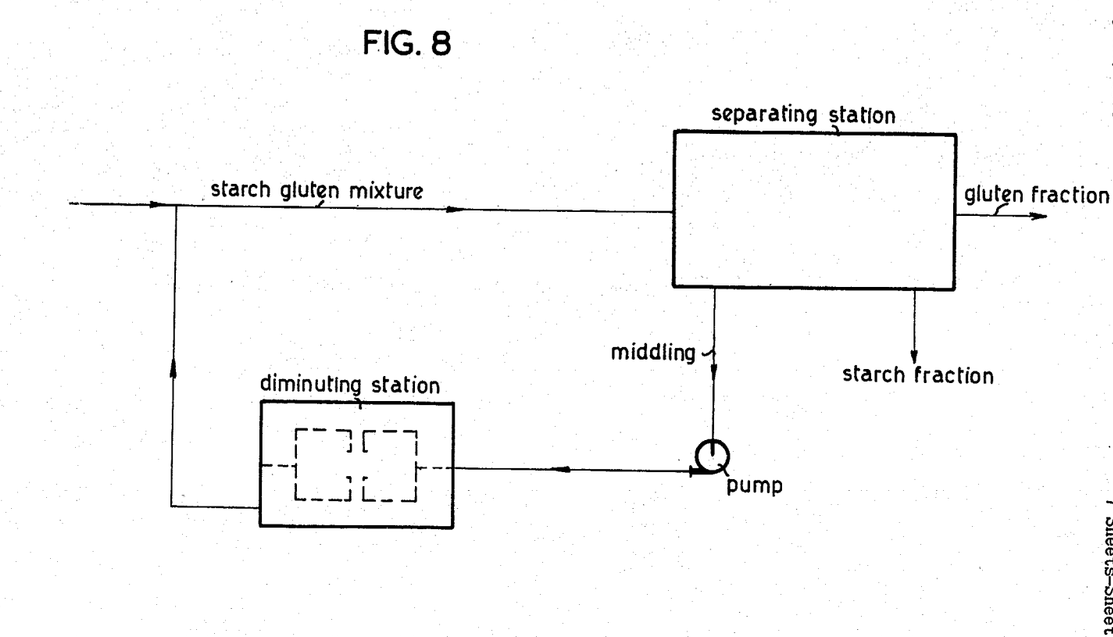
Figure 8 is a flowsheet of a second embodiment of the invention.

Of course many variations of this flow-sheet are possible. In Figure 8 the starch-gluten mixture is fed directly to the separating station in which the mixture is separated in starch, gluten and middling. Such is the case when the separating station consists of starch tables and centrifuges, the latter treating the tailings of the former. Before returning the middling to the starch tables it is treated in a diminutor.

Figure 9:
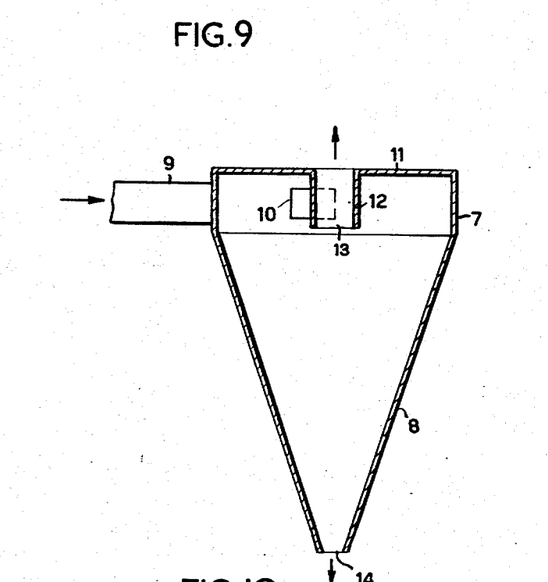
Figure 9 is an enlarged schematical cross section of a hydrocyclone.
Figure 10:
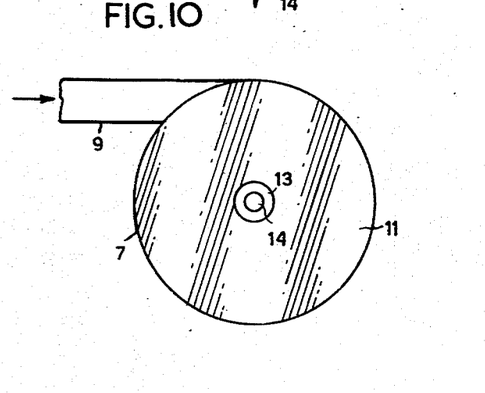
Figure 10 is an enlarged plan view of the hydrocyclone of Figure 9.

A hydrocyclone for the selective diminution and subsequent separation of a starch gluten mixture is shown in Figures 9 and 10. The hydrocyclone unit comprises a cylindrical part 7 and a conical part 8, an infeed pipe 9 in tangential relation to cylindrical part 7, an infeed opening 10. The cylindrical part 7 has a cover 11 and a tube 12, called vortex finder, with opening 13, connected with cover 11 and protruding into the cylindrical part 7. The conical part 8 has an opening 14 at its apex. The openings 13 and 14 are circular and are situated along the axis of the hydrocyclone. In operation the mixture of starch, gluten and liquid, is fed continuously e. g. by means of a pump through infeed pipe 9 and opening 10 into the circular parts of the hydrocyclone unit and the suspension is brought thereby in a quick rotation, which increases from the periphery to the centre of the hydrocyclone. In other words, concentric spiralizing films of the suspended mixture are established and maintained in the hydrocyclone, each inner film travelling at a greater rotational velocity than its adjacent outer film. At the interfaces between adjacent films shearing action is exerted on the suspended particles whereby the gluten particles are diminuted selectively.

The spiralizing films are motivated hydraulically, without the use of paddles or other moving parts.

As a consequence of the quick rotation centrifugal forces are significantly in excess of the force of gravity. Particles having a slow settling rate collect near the centre of the hydrocyclone and are discharged through the vortex finder 12, whereas fast settling solids are centrifuged, collect at the periphery of the hydrocyclone and are discharged through the apex opening 14.

*Example D*

In a test run, the hydrocyclone used had the following dimensions:

|   | Mm. |
|---|---|
| Diameter of the cylindrical part 7 | 4 |
| Height of the cylindrical part 7 | 2 |
| Height of the conical part 8 | 18 |
| Diameter of feed entrance 10 | 1 |
| Diameter opening vortex finder 12 | 1 |
| Diameter apex opening 14 | 0.8 |
| Length of the vortex finder 12 in the cylindrical part 7 | 2 |

At 57 lb./sq. inch feed pressure (4 kg./cm.² gauge pressure) diminuting began, at 71 lb./sq. inch (5 kg./cm.²) satisfactory diminuting was effected. Comparison of these figures with the other example mentioned, will make it clear that 10-mm. hydrocyclones are to be preferred. Nevertheless, 4-mm. hydrocyclones can be used.

Figure 11:
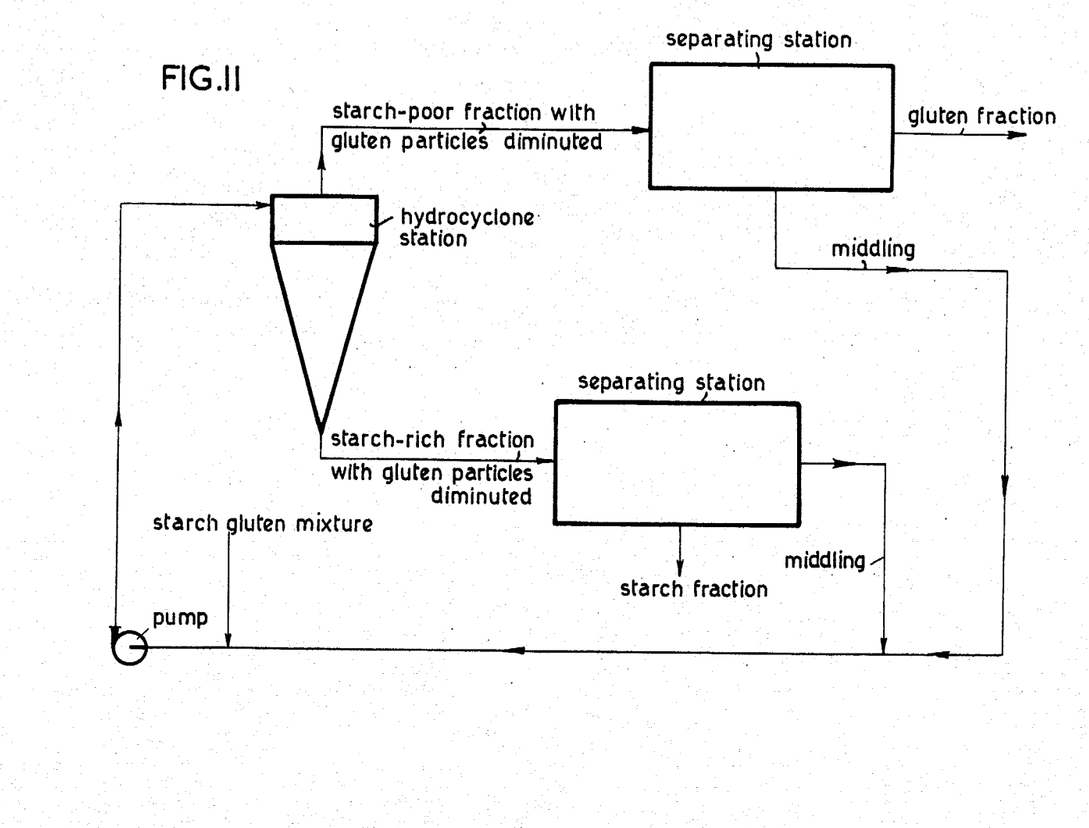
Figure 11 is a flowsheet of a third embodiment of the invention.

In Figure 11 the starch-gluten mixture is fed by a pump into a hydrocyclone station, wherein the gluten particles in the mixture are selectively diminuted. The hydrocyclone further effects a rough separation, so that a starch-rich fraction is discharged through the apex and a starch-poor fraction is discharged through the vortex finders. Both fractions are treated then in separating stations e. g. on starch tables. The tailing of the separated starch-rich fraction and the concentrate of the separated starch-poor fraction are returned to the hydrocyclone station, whereas commercial starch is prepared from the concentrate of the separated starch-rich fraction and cattle-food from the tailing of the starch-poor fraction.

Figure 12:
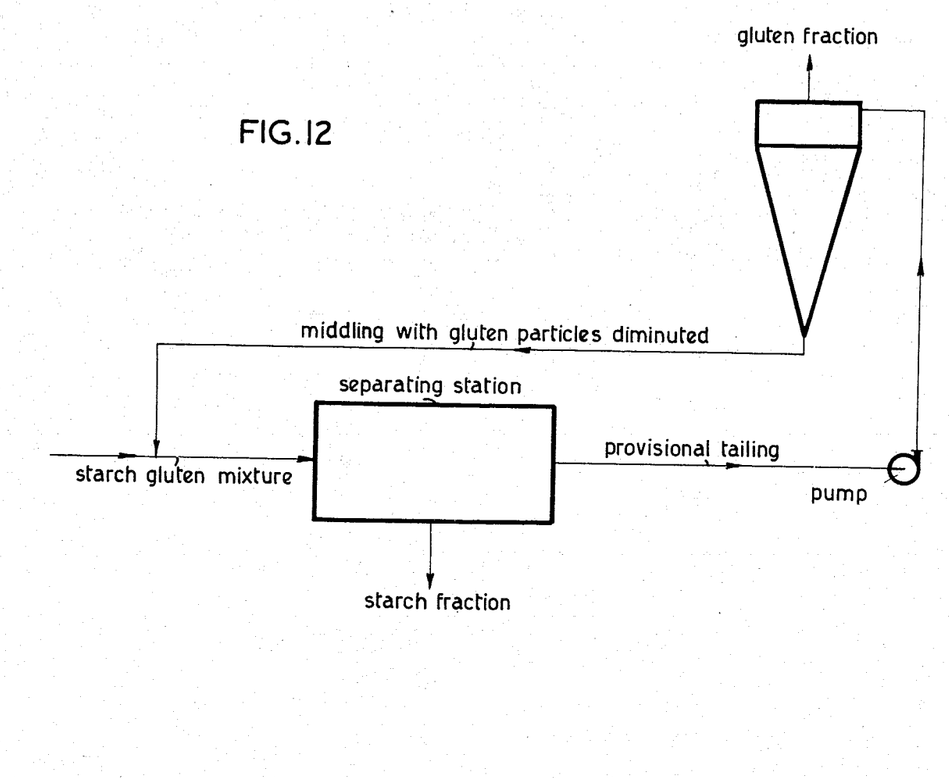
Figure 12 is a flowsheet of a fourth embodiment of the invention.

In Figure 12 the starch-gluten mixture is directly fed into the separating station, from where a gluten-poor starch fraction and a provisional tailing fraction are discharged. The provisional tailing fraction then is pumped into a hydrocyclone, selectively diminuting the gluten particles and discharging a starch-poor gluten fraction through the vortex finder and a starch-rich apex discharge, which is returned to the separating station.

A corn-starch factory using conventional starch tables and centrifuges had been preparing corn-starch containing 0.35–0.40% protein, whereas the dried gluten fraction contained 20–30% of starch.

After hydrocyclones had been introduced to treat the starch and gluten suspension before subjecting the suspension to separation, the plant prepared corn-starch containing 0.28–0.32% protein, whereas the dried gluten fraction contained 12–15% of starch.

The dimensions of the hydrocyclone units were as follows (see Figures 9 and 10):

| | |
|---|---|
| Diameter of the cylindrical part 7_____mm__ | 15 |
| Height of the cylindrical part 7_______mm__ | 6 |
| Height of the conical part 8_________mm__ | 68 |
| Height of infeed entrance 10_________mm__ | 2.3 |
| Width of infeed entrance____________mm__ | 3 |
| Diameter opening vortex finder 12____mm__ | 3 |
| Diameter apex opening 14___________mm__ | 3 |
| Length of the vortex finder 17 in the cylindrical part 7______________mm__ | 5 |
| Infeed pressure, pound per square inch gauge pressure | 114 |

The plant had an hourly capacity of 12 tons of corn the table tailing amounting to 70 cubic meters per hour, was treated in a hydrocyclone station containing 192 hydrocyclone units. The quantities and qualities of the different products are shown in the following table:

|   | Table tailing | Gluten fraction | Return fraction |
|---|---|---|---|
| quantity, m.³/h | ~70 | ~45 | ~25 |
| insoluble, grams/liter | 40–50 | 15–20 | 90–100 |
| starch, percent of insoluble | ~55 | 15–25 | 65–70 |
| protein, percent of insoluble | ~25 | 60–70 | 9–12 |

The corn treated in the plant mentioned above was of ordinary quality. Other corn of different origin and stored under different conditions of time, temperature or weather may require greater or less shearing forces to be exerted on it. If greater shearing force is required that greater force can be brought about by increasing the feed pressure.

As the diminutor units and hydrocyclone units mentioned above have only small capacities, any plant of importance will need large quantities of these apparatus in parallel, whereas the results can be further improved by providing hydrocyclones in series so that the starch-gluten mixture is treated repeatedly. Therefore a diminuting station will contain many diminutor units.

This application is a continuation-in-part of my application Serial No. 181,973, filed August 29, 1950, and now abandoned.

I claim:

1. The continuous process of separating a mixture of corn-starch and gluten in liquid suspension, which comprises forming such suspension into a vortically-spinning liquid body having a diameter of from substantially 4 mm. to not substantially more than 30 mm. in a confined circular space having at least one axial outlet with a vortex discharging therethrough by feeding the suspension tangentially into the confined space at not less than 36 pounds per square inch gauge pressure with the effectiveness increasing with the increase in pressure whereby gluten particles are discriminatingly diminuted hydraulically while leaving starch particles unchanged, and hydraulically separating the mixture with diminuted gluten particles into a starch-poor gluten fraction and starch particles into a gluten-poor starch fraction.

2. The process according to claim 1, wherein the pressure used is substantially 114 pounds per square inch gauge pressure.

3. The process according to claim 1, wherein the separating is effected in a place different from said confined space.

4. The process according to claim 1, wherein there are two discharges from the confined space which discharges prior to their being delivered to a place of separation are joined into one stream.

5. The process according to claim 1, wherein the separating as well as the diminuting is effected in said confined space which said space has a conical section with one axial outlet from its apex and another axial outlet from its base end, and discharging the starch fraction through the apex outlet while discharging the gluten fraction through the base outlet.

6. The process according to claim 5, wherein the apex discharge is separated according to specific gravity into a gluten-poor starch fraction and into a middling which is returned to the confined circular space and wherein the fraction discharged through the axial tube is separated according to specific gravity into a starch poor fraction and into a middling which is returned to the confined circular space.

7. The process of treating a suspended mixture of corn-starch and gluten which comprises separating the mixture into a gluten-poor starch fraction and into a provisional tailing fraction, selectively diminuting and separating the provisional tailing fraction according to claim 5 into a starch-poor gluten fraction and into a middling, and returning the middling to the separating place.

References Cited in the file of this patent

UNITED STATES PATENTS

| Number | Name | Date |
|---|---|---|
| 1,221,990 | Holden | Apr. 10, 1917 |
| 2,032,827 | Andrews | Mar. 3, 1936 |
| 2,039,605 | Peltzer | May 5, 1936 |
| 2,124,284 | Boie | July 19, 1938 |
| 2,132,251 | Wagner | Oct. 4, 1938 |
| 2,138,274 | Greenfield | Nov. 29, 1938 |
| 2,251,448 | Giesecke | Aug. 5, 1941 |
| 2,443,310 | Eckers | June 15, 1948 |
| 2,488,747 | Strezynski | Nov. 22, 1949 |
| 2,525,430 | Smith | Oct. 10, 1950 |
| 2,556,322 | Eckers | June 12, 1951 |